(12) United States Patent
Brady

(10) Patent No.: US 10,944,923 B2
(45) Date of Patent: Mar. 9, 2021

(54) CODE DIVISION COMPRESSION FOR ARRAY CAMERAS

(71) Applicant: Aqueti Incorporated, Durham, NC (US)

(72) Inventor: David Jones Brady, Durham, NC (US)

(73) Assignee: Aqueti Incorporated, Durham, NC (US)

( * ) Notice: Subject to any disclaimer, the term of this patent is extended or adjusted under 35 U.S.C. 154(b) by 0 days.

(21) Appl. No.: 16/437,963

(22) Filed: Jun. 11, 2019

(65) Prior Publication Data

US 2019/0379845 A1   Dec. 12, 2019

Related U.S. Application Data

(60) Provisional application No. 62/683,293, filed on Jun. 11, 2018.

(51) Int. Cl.
*H04N 5/345*   (2011.01)
*H04N 5/378*   (2011.01)

(52) U.S. Cl.
CPC ............. *H04N 5/345* (2013.01); *H04N 5/378* (2013.01)

(58) Field of Classification Search
CPC ......... H04N 5/345; H04N 5/378; H04B 1/707
See application file for complete search history.

(56) References Cited

U.S. PATENT DOCUMENTS

| | | | |
|---|---|---|---|
| 5,550,810 A | 8/1996 | Monogioudis et al. | |
| 5,896,368 A | 4/1999 | Dahlman et al. | |
| 7,336,353 B2 | 2/2008 | Brady et al. | |
| 8,559,708 B2 | 10/2013 | Free | |
| 2006/0038705 A1 | 2/2006 | Brady et al. | |
| 2008/0060034 A1* | 3/2008 | Egnal ................... | G03B 15/006 725/105 |

OTHER PUBLICATIONS

Ali Mousavi et al., "A deep learning approach to structured signal recovery", 2015 53rd Annual Conference on Communication, Control, and Computing (Allerton), Conference Location: Monticello, IL, USA, Sep. 29, 2015, Publisher: IEEE, DOI: 10.1109/ALLERTON.2015.7447163.

Mohan Shankar et al., "Compressive video sensors using multichannel imagers", "Applied Optics", dated 2010, Publisher: Optical Society of America, pp. B9-B17, vol. 49, Issue 10, https://doi.org/10.1364/AO.49.000089.

Patrick Llull et al., "Coded aperture compressive temporal imaging", "Optics Express", Apr. 23, 2013, Publisher: Optical Society of America, DOI:10.1364/OE.21.010526, pp. pp. 10526-10545, vol. 21(9).

Roummel F. Marcia et al., "Superimposed video disambiguation for increased field of view", "Optics Express", Oct. 13, 2008, Publisher: Optical Society of America, pp. pp. 16352-16363, vol. 16, No. 21.

Ali Mousavi et al., "A Deep Learning Approach to Structured Signal Recovery", Aug. 17, 2015, 8 pp.

(Continued)

*Primary Examiner* — Nicholas G Giles

(74) *Attorney, Agent, or Firm* — Kaplan Breyer Schwarz, LLP

(57) ABSTRACT

Aspects of the present disclosure describe systems, methods, and structures for improved compression of array camera image data and improved power budgets for array cameras.

6 Claims, 7 Drawing Sheets

(56) References Cited

OTHER PUBLICATIONS

Authorized Officer: Shane Thomas, International Search Report and Written Opinion issued in counterpart PCT application No. PCT/US2019/036602, Aug. 30, 2019, 7 pp.

Nabeel A. Riza et al., "Demonstration of the CDMA-mode of CAOS smart camera", "Optics Express", Dec. 7, 2017, Publisher: Optical Society of America, 15 pp., vol. 25, No. 25, https://doi.org/10.1364/OE/25/031906.

* cited by examiner

| $X_{11}$ | $X_{12}$ | $X_{13}$ | $X_{14}$ | $X_{15}$ | $X_{16}$ | $X_{16}$ |
|---|---|---|---|---|---|---|
| $X_{21}$ | $X_{22}$ | $X_{23}$ | $X_{24}$ | $X_{25}$ | $X_{26}$ | $X_{26}$ |
| $X_{31}$ | $X_{32}$ | $X_{33}$ | $X_{34}$ | $X_{35}$ | $X_{36}$ | $X_{36}$ |
| $X_{41}$ | $X_{42}$ | $X_{43}$ | $X_{44}$ | $X_{45}$ | $X_{46}$ | $X_{46}$ |
| $X_{51}$ | $X_{52}$ | $X_{53}$ | $X_{54}$ | $X_{55}$ | $X_{56}$ | $X_{56}$ |
| $X_{61}$ | $X_{62}$ | $X_{63}$ | $X_{64}$ | $X_{65}$ | $X_{66}$ | $X_{66}$ |
| $X_{71}$ | $X_{72}$ | $X_{73}$ | $X_{74}$ | $X_{75}$ | $X_{76}$ | $X_{77}$ |

*FIG. 1*

CODE DIVISION COMPRESSION FOR ARRAY CAMERAS

TECHNICAL FIELD

This disclosure relates generally to systems, methods, and structures for image capture employing array cameras. More specifically, it pertains to compression of image data for array cameras.

BACKGROUND

As will be readily understood by those skilled in the art, operating power is a key limitation in contemporary camera pixel capacity. As is known, a typical contemporary camera system includes a focal plane and a "system on chip"—image processing platform chip (ISP). This image processing platform chip advantageously implements various image processing functions, such as demosaicing, nonuniformity correction, etc. as well as image compression.

Array cameras—which use an array of cameras and multiple focal planes to capture data in parallel—are increasing in popularity as they allow the parallel capture and processing of large image data fields. Advantageously, each individual camera in the array may capture a different area in the overall array camera field of view or may capture diverse color, exposure or focal range components.

Where single focal plane cameras may capture 1-20 megapixel images, array camera systems may capture 100-1,000 megapixels per "frame." This data volume and rate considerably strains system communication, processing and storage resources. Operation is further complicated when considering power requirements of contemporary camera systems. More particularly, focal plane operation at common video rates may require 1 nanojoule per captured pixel and per pixel processing to create a read-out compressed data stream typically requires 5-10× more power than pixel capture, e.g. ~10 nanojoules per pixel.

Accordingly, systems, methods, and structures that improve the compression performance of array cameras while improving their significant power requirements would represent a welcome addition to the art.

SUMMARY

An advance in the art is made according to the present disclosure which describes systems, methods and structures for improved array camera operation. Advantageously, systems, methods, and structures according to the present disclosure provide an immediate compression of array camera data streams with minimal processing.

In sharp contrast to the prior art—and in particular in contrast to contemporary, conventional cameras in which every pixel must be processed because all pixels are used in producing the visualized image—array cameras according to the present disclosure do not initially display every captured pixel.

More significantly—in array cameras according to the present disclosure—scenes are analyzed in compressed or low-resolution format prior to analysis of high-resolution components. Since many pixels may never be observed, significant processing improvement and power budget improvements are realized by delaying image processing until one knows which pixels need analysis.

By minimizing operations per pixel on capture, overall system power in a capture head is reduced to a level comparable to the sensor read-out power. Advantageously, this is achieved by eliminating the need to buffer pixels and to perform more than one numerical operation per pixel.

According to further aspects of the present disclosure, we specifically describe a method for accumulating data from parallel pixel data streams wherein each pixel stream is modulated by a code to enable "source separation" during later processing. Our method applies direct sequence code division multiple access thereby enabling just one numerical operation per captured pixel in the sensor process.

In sharp contrast to the prior art and according to further aspects of the present disclosure, camera image data processing is separated between processing steps implemented in the camera head and processing steps implemented in post processing for image display, which may also be performed in the head or may be performed in a remote render machine—i.e., cloud based. As will be readily understood and appreciated by those skilled in the art, such systems, methods, and structures according to the present disclosure substantially reduces the number of processing steps implemented in a camera head during initial image capture and processing pipeline, thereby substantially reducing the size, weight and power of any image processing electrical hardware located in the head.

The illustrative embodiments are described more fully by the Figures and detailed description. Different aspects of this disclosure may, however, be embodied in various forms and are not limited to specific or illustrative embodiments described in the Figures and detailed description

BRIEF DESCRIPTION OF THE DRAWING

A more complete understanding of the present disclosure may be realized by reference to the accompanying drawing in which:

FIG. 1 shows a table depicting an illustrative camera pixel read-out configuration according to aspects of the present disclosure;

DESCRIPTION

Figure 2:
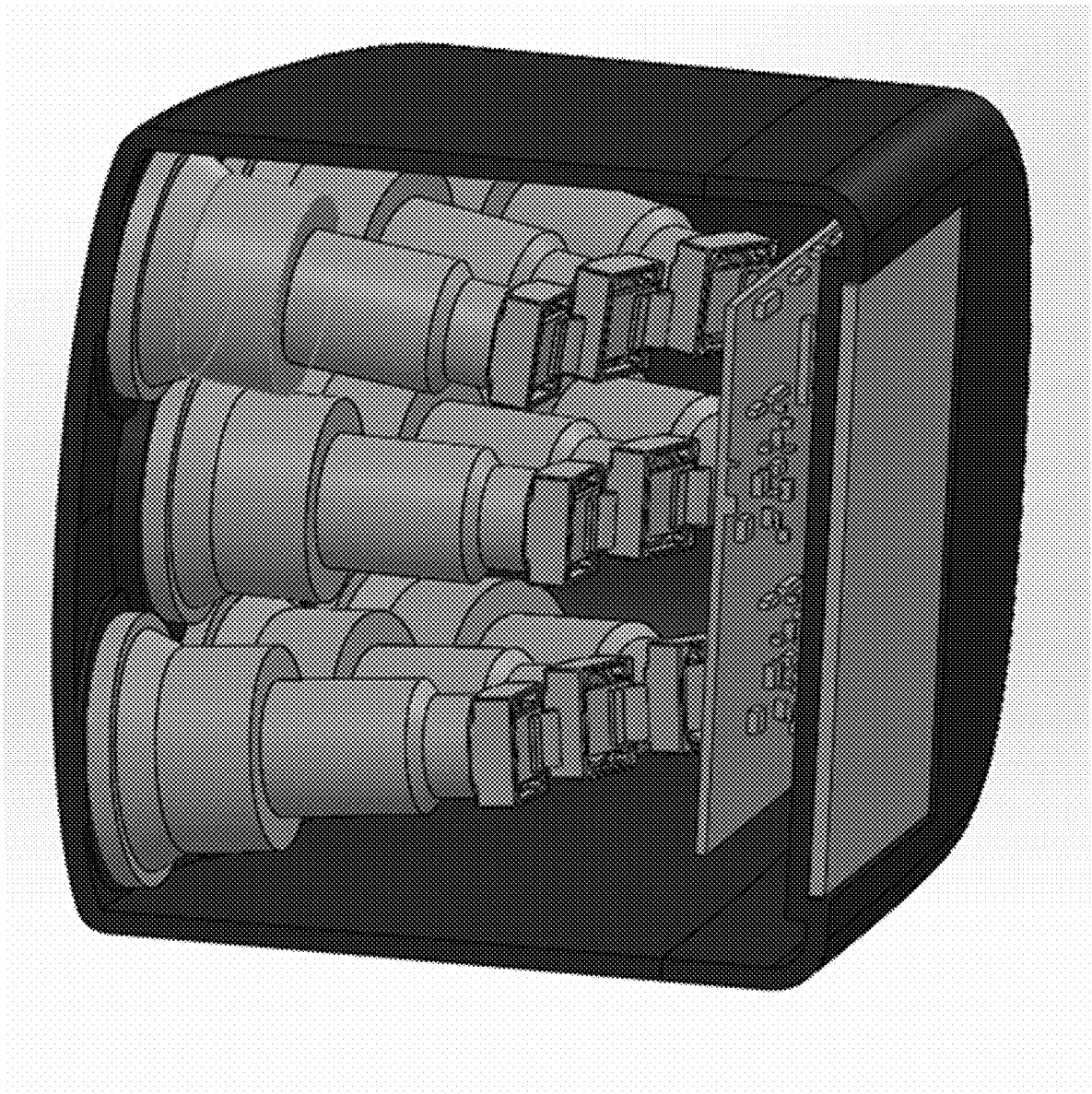
FIG. 2 shows a schematic diagram depicting an illustrative array camera configuration according to aspects of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the FIGs comprising the drawing are not drawn to scale.

By way of some additional background, it is noted that in consideration of possible electronic formats for transmission or information storage, a typical images sensor of a contemporary camera captures 1-20 megapixels at rates of 10-100 frames per second, meaning that this typical camera captures 200-2000 pixels per second. In array cameras having 10-100 microcameras, overall pixel rates may reach 1-100 gigapixels/second. With 1-2 bytes of digital data per pixel, this corresponds to 1-200 gigabytes/second of data. As will be understood and appreciated by those skilled in the art, information transmission and storage at such high data rates is inefficient, so contemporary camera sensors are typically paired with image signal processing chips that immediately compress the pixel data streams according to accepted standards, such as JPEG, h.264, h.265 or AV1.

While standard compression algorithms are often implemented in hardware application circuits to improve power efficiency and speed, these algorithms still require substantial power and memory resources. In addition, ISP chips typically implement color demosaicing and other image processing algorithms that also require power and chip area. In view of the multiple digital steps per pixel required in these processes, ISP chips commonly use substantially more power than image sensor capture and read-out.

With respect to high resolution (100 megapixel or more) array video cameras, conventional ISP processing and compression is inefficient because many pixels may never be observed by humans. In security and machine vision applications in particular, sensor data is analyzed for control and target features, and only particularly important pixels or regions are processed for image display. Video analysis may in many cases be implemented directly on compressed formats without the need for demosaicing or advanced processing.

We note that compressive measurement is a mechanism for substantially reducing camera head power. As disclosed in United States Patent Application Publication No. 20060038705A1 directed to Compressive Measurement and Signal Inference as well as subsequent patents, compressive measurement uses physical layer coding to project image data onto coded patterns that can be computationally inverted to recover the original image. Such methods may be used in spectral imaging, as disclosed in U.S. Pat. No. 7,336,353 or in temporal imaging, as disclosed in Llull, P., Liao, X., Yuan, X., Yang, J., Kittle, D., Carin, L., . . . & Brady, D. J. (2013) *Coded aperture compressive temporal imaging*, which appeared in Optics express, Vol. 21(9), pp. 10526-10545—the contents of which are incorporated by reference herein as if set forth at length.

We note further that disadvantages of physical layer compressive measurement for cameras include (1) the fact that only nonnegative weights may be applied to multiplex measurement of light intensities and (2) compressive measurement systems as described above require relay optics that greatly increase system size and complexity.

The basic mathematical structure of these systems offers many advantages, however. Compressive measurement as described in the hyperspectral and temporal systems listed above can be viewed as a form of "direct sequence code division multiple access," wherein different spectral or temporal planes are multiplied by codes that enable "source separation" to computationally isolate and reconstruct those planes.

Here we disclose methods for digital direct sequence code division multiple access modulation of image data to obtain similar advantages of the above physical layer techniques while also overcoming noted disadvantages (1) and (2).

As disclosed in U.S. Pat. No. 5,550,810, direct sequence code division multiple access (DS-CDMA) involves multiplying set of information data streams by a corresponding set of spreading codes. Each source is assigned a code that is ideally orthogonal to codes associated with other channels. A filter or filter bank at receiver sights demodulates the received signal by the spreading codes to independently isolate the source signals.

As originally disclosed, DS-CDMA is not a signal compression method, but as demonstrated by the success of the hyperspectral and temporal compressive sensing methods listed above, DS-CDMA may be applied with even with non-orthogonal spreading codes to code data for nonlinear source isolation using decompressive source separation and estimation techniques. As most commonly developed in compressive sampling systems these decompression strategies have relied on convex optimization, but more recently neural network based decompressive inference have proved effective, as discussed for example in Mousavi, Ali, Ankit B. Patel, and Richard G, Baraniuk. "A deep learning approach to structured signal recovery." *Communication, Control, and Computing (Allerton), 2015 53rd Annual Aileron Conference on.* IEEE, 2015.

These methods stand in contrast to common image compression strategies as implemented, for example, in JPEG, MPEG, h.264, etc. These standards transform localized spatial, spectral and/or temporal blocks in the image data cube onto "sparsifying" basis. For example, JPEG consists of a block based discrete cosine transformation along with coefficient thresholding and quantization, followed by lossless sequence compression. Video standards add temporal frame differential analysis to this approach, JPEG2000 extends this approach using multiscale transformations over still localized bases. These approaches are based on the fact that pixels within a localized region contain correlated data, which enables compression. Such pixel maps may be sparsely represented by transformation onto a different basis.

The difference between the two approaches to compression may be explained as follows:

Consider two numbers, A and B. In communicating A or B a certain amount of information is transmitted based on the probability entropy implicit in each number. If the mutual information of A and B is nonzero, then communication of A+B may transmit a different amount of information than A−B. JPEG compression relies on this fact to communicate information, since in images if A and B are adjacent pixels A+B almost always involves more information than A−B. At an edge, A−B may communicate more, so JPEG sends only values of A−B at points where this value is large.

Code division multiple access, in contrast, involves communication of sums of signals where there is no mutual information between the signals. If only two signal values are to be sent and if A and B have zero mutual information, then communication of A+B involves exactly the same amount of information as A−B. However, if values A and B are to be sent from one compressible signal and if values C and D are to be sent from a second compressible signal, then communication of g1=A+C and communication of g2=B−D may be a useful mechanism for transmitting compressive information about both the first signal and the second signal. If A+B and C+D are expected to be large while A−B and C−D are expected to be small, then g1+g2 is mostly informs the value of A+B while, g1-g2 mostly informs regarding C+D. If instead of the code (the minus sign on D) both signals were simple sums of the two channels, there would be no mechanism for distinguishing A+B and C+D. Through decompressive inference, this basic strategy uses more complex and longer coding sequences to separate the two uncorrelated signals based on prior knowledge of their likely characteristics.

Current focal planes read-out data in raster format, meaning rows are read-out in sequence. The basic structure is shown in FIG. 1. Pixel values, represented as are read-out in order as $x_{1j}$ for j from 1 to 7, then $x_{2j}$, etc. Of course, typical focal planes have more than just 47 pixels, i and j typically extend to several thousand. In addition to the row by row spatial read-out structure illustrated here, it is important to remember that frames are also read sequentially in time, so the pixel values in general are indexed by three values, $x_{ijk}$, with k corresponding to frame number. Pixels also correspond to different colors, typically red, green and blue, but the color values are typically "mosaicked" across the sensor so that a given pixel corresponds to a given known color.

Pixel values in current cameras are buffered for demosaicing, image processing (nonuniformity correction, color space transformation, denoising, sharpening, white balance and black level adjustment, etc.) and compression. Since compression is implemented as a two-dimensional transformation, multiple rows (i.e., 8) must be buffered and each pixel value must be accumulated in several transformation buffers. In addition, division of pixel values by quantization matrices and compressive (Huffman) coding must be implemented on each image block.

As we shall show and describe, systems, methods, and structures according to the present disclosure minimize the number of numerical operations per pixel on read-out as well as minimizing image data buffer requirements in order substantially reduce camera head power and memory requirements. Operationally, we implement two forms of data compression:

1. Local region (feature) coding and
2. Remote region code division multiple access Local region coding involves subsampling the image data stream coming from a single sensor. Remote region coding involves modulating image data streams from different regions by codes and then summing pixel data together for transmission or storage.

As we have noted, the present disclosure deals specifically with data processing, read-out and storage for array cameras. Turning our attention now to FIG. 2, there is shown a schematic diagram illustrating a contemporary array camera according to aspects of the present disclosure. As is known, array cameras include arrays of "microcameras." As illustrated in the figure, each of the individual cylindrical objects corresponds to a lens and electronic sensor(s), e.g. a microcamera. In the overall array camera system illustrated, the individual microcameras point in a different direction from one another and therefore observe different fields of view.

Figure 3:
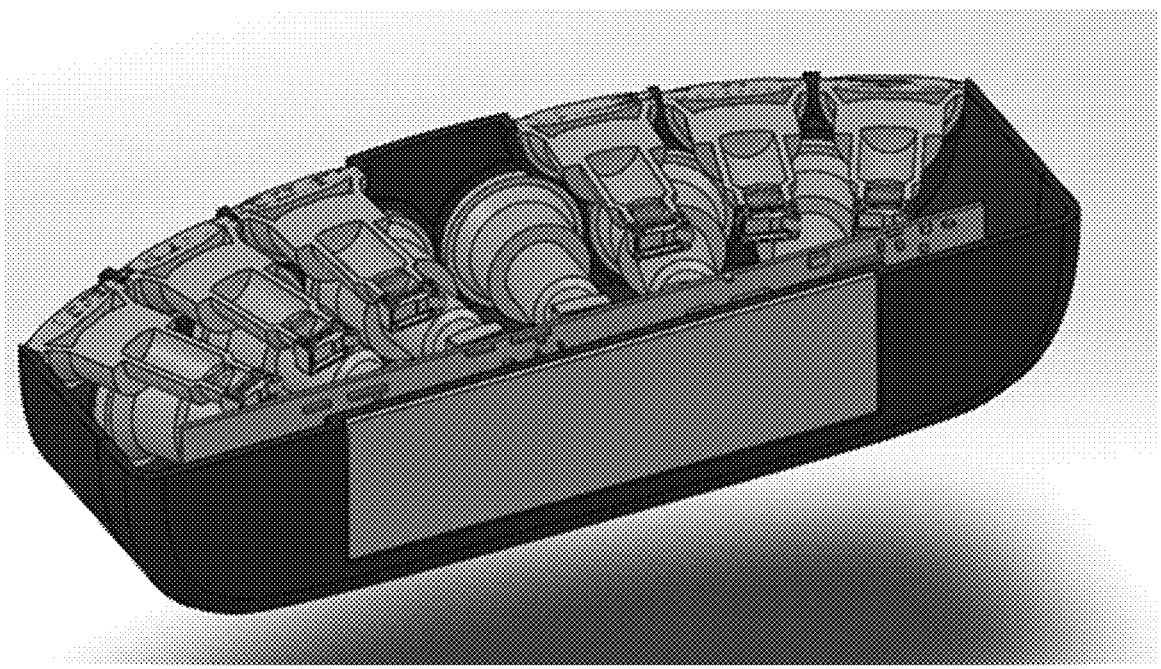
FIG. 3 shows a schematic diagram depicting an alternative illustrative array camera configuration according to aspects of the present disclosure.

As will be readily appreciated by those skilled in the art, many different microcamera arrangements are possible. FIG. 3 shows a schematic diagram depicting an alternative arrangement of an illustrative array camera according to aspects of the present disclosure. As those skilled in the art will readily understand and appreciate, further alternative arrangements/configurations are known. More particularly, ring arrangements enabling 360 degree field of view capture are employed for capturing virtual reality media, stereo arrangements are employed to capture 3D perspective, and arrays exhibiting different color sensitivities or different temporal sampling (as in M. Shankar, N. P. Pitsianis, and D. J. Brady, "Compressive video sensors using multichannel imagers," *Appl. Opt.* 49(10), B9-B17, (2010).—which is incorporated by reference in its entirety) are also of interest.

Of particular advantage, array camera systems may capture different ranges or focal depths using diverse focal lengths or focus settings. In each individual configuration however, array camera data must be read-out of the overall camera system using parallel or serial streaming from the array.

The matrix of pixel values illustrated previously by $x_{ij}$ in FIG. 1 corresponds to data on a single sensor, e.g. data read-out from a single microcamera. "remote region code division multiple access" refers to joint coding of data from multiple microcameras.

Let $x_{ijk}^m$ refer to the $ij^{th}$ spatial pixel at time k from the $m^{th}$ microcamera. The process we refer to as "remote region direct sequence code division multiple access consists of creating the coded signal where $c_{ijk}^m$ is a code value corresponding to the $ij^{th}$ spatial pixel at time k for the $m^{th}$ microcamera. $c_{ijk}^m$ is typically drawn from +1 and −1, but other code values may be considered. The sequence for a given microcamera may be selected to be orthogonal or quasi-orthogonal to the code for other microcameras, using for example the Gold codes common to CDMA, but quasi-random or other codes may also be used. The code here serves a similar purpose to the codes to separate superimposed frames in spectral imaging and compressive video mentioned above, but since the codes here can be independently implemented in electronic processing on each superimposed microcamera, substantially greater orthogonality can be achieved.

Those skilled in the art will immediately recognize that decompressive source separation algorithms as previously demonstrated using convex optimization and/or neural processing algorithms can be used to recover the multiplexed frames $x_{ijk}^m$ from $g_{ijk}$, even though m frames have been multiplexed into just 1 (e.g. the compression factor is m). In fact, this separation of compressed frames from each other is mathematically identical to the decompression already demonstrated in single shot spectral imaging and compressive coded aperture temporal imaging. The ability to digitally code the frames makes source separation mathematically more tractable, although the fact that the multiplexed frames contain unrelated data makes high compression ratios more difficult to achieve.

Source separation as described here may also be considered as a generalization of separation of superimposed frames as described in Roummel F. Marcia, Changsoon Kim, Cihat Eldeniz, Jungsang Kim, David J. Brady, and Rebecca M. Willett in an article entitled "Superimposed video disambiguation for increased field of view," which appeared in Opt. Express 16, pp. 16352-16363 (2008), with the innovation of using CDMA to code the superimposed frames and thereby improve the quality of frame recovery.

Remote region code division multiple access coding takes advantage of the fact that vestiges of each original image can be perceived in the images modulated by the code features. This is because the images are not random patterns, they are sparse on some basis and tend to exhibit relatively smooth regions with occasional sharp features.

An individual image is compressible because it does not fully utilize the channel capacity implicit in its pixel array. Conventional compression takes advantage of this fact to substantially reduce the number of bits needed to express the image. The disadvantage of conventional compression strategies is that they are computationally expensive. They require storage of several rows and even several temporal frames or frame differences to implement sparsifying transformations.

Code division multiple access, in contrast, may be somewhat less compressive and on reconstruction is more computationally expensive, but it is much less computationally expensive when performed at the moment of signal encoding. As described above, it does not require buffering of any data and requires no logical operations or signal value analysis. Advantageously, it is a simple and immediate compression of all currently available pixels.

In comparison with transformations such as the discrete cosine or wavelet transform, which require tens or hundreds of operations on each pixel value, DS-CDMA as described above operates just once on each pixel value. Since the encoding power is proportional to the total number of logical operations, DS-CDMA may reduce electrical power required on read-out of array cameras by one or more orders of magnitude.

As illustrated by the >100 W needed to operate contemporary array cameras, electrical power reduction is a core and essential challenge for camera capacity. Electrical system volume is also currently larger than optical system volume in array cameras, reductions as described here are essential to continued growth in pixel capacity.

It is also important to note that mobile phones have evolved from 1 to 3 or even more camera modules. Typically, only one camera module is operated at a time since the processing power and information capacity of phone systems is limited. Advantageously, the method described herein may be expected to allow continued growth in the number of microcameras incorporated into mobile phone systems.

As those skilled in the art will readily appreciate, the systems, methods and structures described herein according to the present disclosure are attractive for at least the following reasons namely, (1) most pixels in high pixel count array cameras may never be observed and (2) image data compressed as described herein may be analyzed to determine which parts of the image data stream require decompression. By decompressing a limited volume in the imaging data "cube", the total power expended on decompression is advantageously reduced. In many ultra-high-resolution camera systems on-device power is limited but considerable off-device or cloud processing power is available. On a mobile phone or battery-operated camera, saving on-device power is critical, but substantial processing power may be used to decompress the saved image data stream in cloud services or off line processing.

Those skilled in the art will recognize that hybrid systems combining local feature coding and remote region CDMA may be attractive. For example, one may choose to independently transmit down-sampled or averaged data from each microcamera to allow construction of low resolution images with no or minimal computational while using CDMA multi-microcamera coding on higher resolution features. Those skilled in the art will also recognize that it may be advantage to implement compressive multipixel transformations on the microcamera data streams prior to multiplexing them with CDMA codes. In this sense, the pixel map of each microcamera as described above may include processed, demosaiced or precoded data streams rather than the raw pixel values. In any case, the innovative step as disclosed here consists of multiplexing the microcamera data streams together using code division multiple access.

It is also important to note that additional compression, coding and analysis steps may be implemented on the data stream after microcamera data is multiplexed together. For example, distinctive features, such as faces, text, materials or objects may be directly detected and identified using machine learning algorithms on the multiplexed data steam. The advantage of this approach is that the multiplexed data stream contains I times fewer degrees of freedom than the independent camera data streams, meaning that operational power and electronics volume may be reduced by m times by this strategy. Similarly, as with the example of values ABCD described above, transformations such as DCT coding or temporal frame variation may be implemented on the multiplexed data stream with a saving of m times relative to the individual streams. The overall strategy remains to combine data as early as possible and to minimize image processing steps prior to identifying which data is to be processed and prior to transfer to off camera processing resources.

It is also important to note that the method for combining data from multiple independent sensor by multiplying each stream by a code and adding may be generalized to more complex strategies for combining data from multiple independent sensors. For example, one may use a neural network with inputs drawn from each of the independent sensors to generate a bit or code word based on the current data reported by each sensor. Such coded data may then be reconstructed using a complementary off line neural processor.

It is also important to note that while the coding process as described herein depends only on the current pixel read off each sensor line by line, thus drastically reducing encoding power requirements, decoding is likely to be based on analysis of an extended region or block of the space-time data cube. For example, in decoding one may use an 8 by 8 by 8 block of coded space time to reconstruct the m independent 8 by 8 by 8 microcamera image blocks. Larger block sizes may also be considered, as well as multiscale blocks in which features are coded with different levels of compression on different scales. It is also important to note that color data is implicit in the coding scheme and color demosaicing may be implemented either prior to multiplexing or as part of the decompression algorithm.

Example Separation

Figure 4:
FIG. 4 shows an illustrative image 28×28 pixels wherein images were added pairwise after one of the images had been multiplied by a quasi-random code with code values chosen from +1 and −1 according to aspects of the present disclosure.
Figure 5:
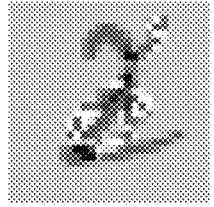
FIG. 5, FIG. 6, FIG. 7, and FIG. 8 each show an illustrative set of test images operated on via neural network according to aspects of the present disclosure.
Figure 6:
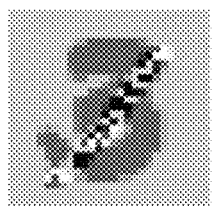
Figure 7:
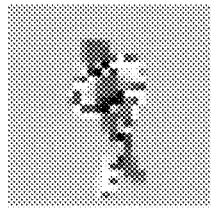
Figure 7:
Figure 7:
Figure 7:
Figure 7:
Figure 8:
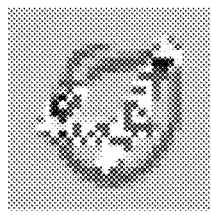
Figure 8:
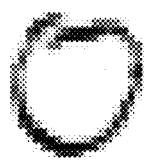
Figure 8:
Figure 8:
Figure 8:
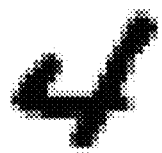

As an example of the method disclosed here, we simulated CDMA-based separation of images drawn from the Modified National Institute of Standards and Technology database. Each image is 28 by 28 pixels. Image were added pairwise after one of the images had been multiplied by a quasi-random code with code values drawn from +1 and −1. FIG. 4 shows a particular implementation of the code:

The multiplexed images were then separated using a 4 layer neural network described by the following code in the Keras environment:

```
# coding layer
model = Sequential( )
model.add(Flatten(input_shape=(28,28,1)))
model.add(Dense(image_size*image_size*2, activation='relu'))
model.add(Reshape((image_size, image_size,2)))
model.add(Conv2D(filters=6,kernel_size=kernel_size,
    activation='relu',
    padding='same'))
model.add(Conv2D(filters=4,kernel_size=kernel_size,
    activation='relu',
    padding='same'))
model.add(Conv2D(filters=2,kernel_size=kernel_size,
    activation='sigmoid',
    padding='same'))
```

The first layer is a dense netor transforming the 28 by 28 input image into a 28 by 28 by 2 layer image. Three convolutional network layers were then used to restore the images to their original form.

Example separations on test images not included in the network training set are shown illustratively in FIG. 5, FIG. 6, FIG. 7, and FIG. 8. With simultaneous reference to those figures, it is noted that the upper left image is the compressed multiplexed image that would be received at the decompression system. The two center images are the images restored from the compressed data. The two right most images are the original images from the MNIST data set.

Those skilled in the art will readily understand and appreciate that while deeper networks may be used and more images may be multiplexed together, this code demonstrates the functionality of the compressive sampling method disclosed here.

Figure 9:
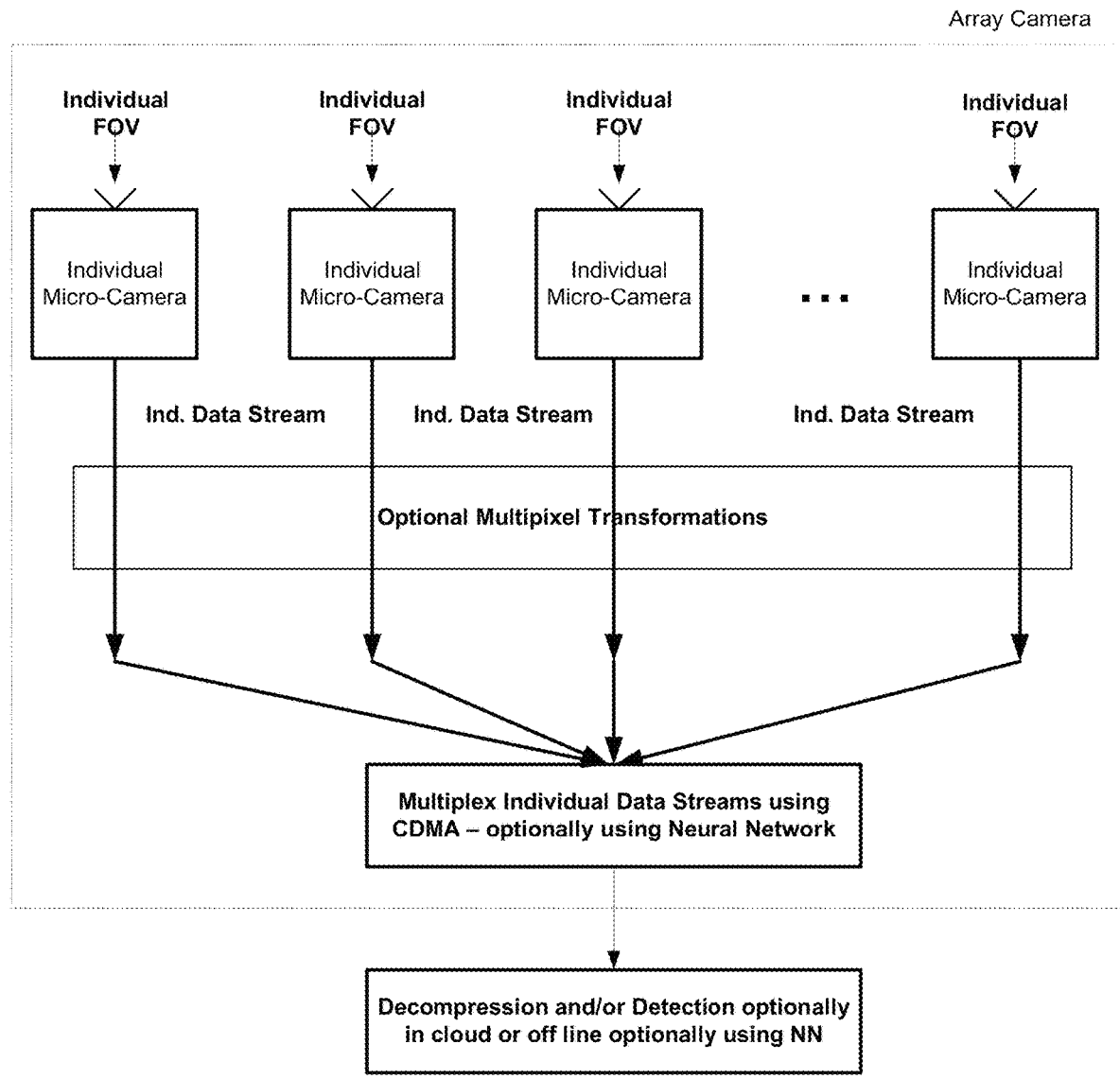
FIG. 9 is a schematic diagram depicting an illustrative array camera and further illustrative operational considerations according to aspects of the present disclosure.

FIG. 9 is a schematic diagram depicting an illustrative array camera and illustrative operation according to aspects of the present disclosure. As may be observed from that schematic diagram, a plurality of individual micro-cameras each "observing"/detecting/imaging an individual field-of-view (FOV), each generates an individual data stream which—as we have previously described—are multiplexed together via a CDMA (DS-CDMA) process—preferably locally proximate in space and time to generate a multiplexed signal.

As previously noted, such CDMA multiplexing may be performed in the "head" of the camera, or at a point/structure subsequent to provide a more efficient power budget. Additionally—and as schematically shown in the figure, an optional multipixel transformation—or multiples—may be performed prior to the multiplexing. As we have further shown and described, decompression and or detection may be subsequently performed on the multiplexed data steam via any of a number of networking methodologies including "cloud" resources and/or neural networks.

An illustrative CDMA coding routine according to aspects of the present disclosure is presented below.

CDMA Coding of MNIST Images

```
Using TensorFlow backend.
Downloading data
11493376/11490434 [==============================] -
1s 0us/step
from __future__ import absolute_import
from __future__ import division
from __future__ import print_function
import keras
from keras.layers import Activation, Dense, Input
from keras.layers import Conv2D, Flatten
from keras.layers import Reshape, SeparableConv2D
from keras.models import Model
From keras.models import Sequential
from keras import backend as K
from keras.datasets import mnist
import numpy as np
Import matplotlib.pyplot as plt
from PIL import Image
import matplotlib as mpl
np.random.seed(1337)
# MNIST dataset
(x_train, _), (x_test, _) = mnist.load_data( )

# reshape the training and testdata into vectors and rescale for neural
processing

image_size = x_train.shape[1]
x_train = x_train.astype('float32') / 255
x_test = x_test.astype('float32') / 255
y_train=np.stack((x_train,x_train[-1:(-x_train.shape[0]-1):-1,:,:]),
axis=3)
y_test=np.stack((x_test,x_test[-1:(-x_test.shape[0]-1):-1,:,:]),axis=3)
x_train = np.reshape(x_train, [-1, image_size, image_size, 1])
x_test = np.reshape(x_test, [-1, image_size, image_size, 1])
(60000, 28, 28, 2)
y_train.shape

# lets generate our coding mask

codeAp=2*np.random.randint(2,size=(image_size,image_size))-1
plt.imshow(codeAp)
<matplotlib.image.AxesImage at 0x7f6d30b2bba8>
# lets start by trying to separate two added images . . . . . .
# why didn't we do this coding trick with the old multi
image addition?????

x_train_coded=np.multiply(x_train[-1:(-x_train.shape[0]-1):
-1,:,:,0],codeAp)
x_train_coded = np.reshape(x_train_coded, [-1,
image_size, image_size, 1])
x_train_coded=x_train+x_train_coded
x_test_coded=np.multiply(x_test[-1:(-x_test.shape[0]-1):-1,:,:,0],
codeAp)
x_test_coded = np.reshape(x_test_coded, [-1, image_size,
image_size, 1])
```

```
x_test_coded=x_test+x_test_coded
<matplotlib.image.AxesImage at 0x7f22c0621278>
plt.imshow(x_train_coded[306,:,:,0])
<matplotlib.image.AxesImage at 0x7f6d2ea40b38>
plt.imshow(y_train[306,:,:,0])
# Network parameters
batch_size = 128
kernel_size=5
# coding layer
model = Sequential( )
model.add(Flatten(input_shape=(28,28,1)))
model.add(Dense(image_size*image_size*2, activation='relu'))
model.add(Reshape((image_size, image_size,2)))
model.add(Conv2D(filters=6,kernel_size=kernel_size,
activation='relu',
padding='same'))
model.add(Conv2D(filters=4,kernel_size=kernel_size,
activation='relu',
padding='same'))
model.add(Conv2D(filters=2,kernel_size=kernel_size,
activation='sigmoid',
padding='same'))
model.compile(optimizer='adam',
loss='mse',
metrics=['accuracy', 'mae'])
moSdaevle.df istu(cxc_etsrsaliunil_ycl oded,y_train,
epochs=10, batch_size=64)
Epoch 1/10
60000/60000 [==============================] -
181s 3ms/step - loss:
0.0204 - acc: 0.6
Epoch 2/10
19712/60000 [========>.............] - ETA: 2:01 - loss:
0.0065 - acc: 0.6133
Epoch 3/10
6336/60000 [==>...................] - ETA: 2:42 - loss: 0.0049 -
acc: 0.6043
Epoch 4/10
192/60000 [.....................] - ETA: 3:05 - loss: 0.0044 -
acc: 0.6094
Epoch 5/10
23040/60000 [=========>............] - ETA: 1:51 - loss:
0.0039 - acc: 0.6055
Epoch 6/10
7936/60000 [==>...................] - ETA: 2:37 - loss: 0.0037 -
acc: 0.6068
Epoch 7/10
1088/60000 [.....................] - ETA: 2:58 - loss: 0.0036 -
acc: 0.6113
Epoch 8/10
22848/60000 [=========>............] - ETA: 1:52 - loss:
0.0033 - acc: 0.6125
Epoch 9/10
7744/60000 [=>....................] - ETA: 2:39 - loss: 0.0032 -
acc: 0.6088
Epoch 10/10
640/60000 [.....................]54144/60000
[========================>..
<keras.callbacks.History at 0x7f6d2ea40e80>
dip=model.predict(x_test_coded)
(10000, 28, 28, 2)
dip.shape
<matplotlib.image.AxesImage at 0x7f6d2ddbe358>
plt.imshow(dip[306,:,:,1])
plt.imshow(dip[306,:,:,0])
<matplotlib.image.AxesImage at 0x7f6d2bc96d30>
<matplotlib.image.AxesImage at 0x7f6d2abea4e0>
plt.imshow(x_test[306,:,:,0])
plt.imshow(x_test[-307,:,:,0])
<matplotlib.image.AxesImage at 0x7f6d2ab40b38>
<matplotlib.image.AxesImage at 0x7f6d2ab21400>
plt.imshow(x_test_coded[306,:,:,0])
import matplotlib as mpl
mpl.rcParams[ 'figure.figsize' ] = (16.0, 8.0)
iN=306
plt.subplot(3,3,1)
plt.imshow(x_test_coded[iN,:,:,0])
cur_axes = plt.gca( )
cur_axes.axes.get_xaxis( ).set_visible(False)
cur_axes.axes.get_yaxis( ).set_visible(False)
plt.subplot(3,3,2)
plt.imshow(dip[iN,:,:,0])
cur_axes = plt.gca( )
cur_axes.axes.get_xaxis( ).set_visible(False)
cur_axes.axes.get_yaxis( ).set_visible(False)
plt.subplot(3,3,3)
plt.imshow(x_test[iN,:,:,0])
cur_axes = plt.gca( )
cur_axes.axes.get_xaxis( ).set_visible(False)
cur_axes.axes.get_yaxis( ).set_visible(False)
plt.subplot(3,3,5)
plt.imshow(dip[iN,:,:,1])
cur_axes = plt.gca( )
cur_axes.axes.get_xaxis( ).set_visible(False)
cur_axes.axes.get_yaxis( ).set_visible(False)
plt.subplot(3,3,6)
plt.imshow(x_test[-(iN+1),:,:,0])
cur_axes = plt.gca( )
cur_axes.axes.get_xaxis( ).set_visible(False)
cur_axes.axes.get_yaxis( ).set_visible(False)
iN=200
plt.subplot(3,3,1)
plt.imshow(x_test_coded[iN,:,:,0])
cur_axes = plt.gca( )
cur_axes.axes.get_xaxis( ).set_visible(False)
cur_axes.axes.get_yaxis( ).set_visible(False)
plt.subplot(3,3,2)
plt.imshow(dip[iN,:,:,0])
cur_axes = plt.gca( )
cur_axes.axes.get_xaxis( ).set_visible(False)
cur_axes.axes.get_yaxis( ).set_visible(False)
plt.subplot(3,3,3)
plt.imshow(x_test[iN,:,:,0])
cur_axes = plt.gca( )
cur_axes.axes.get_xaxis( ).set_visible(False)
cur_axes.axes.get_yaxis( ).set_visible(False)
plt.subplot(3,3,5)
plt.imshow(dip[iN,:,:,1])
cur_axes = plt.gca( )
cur_axes.axes.get_xaxis( ).set_visible(False)
cur_axes.axes.get_yaxis( ).set_visible(False)
plt.subplot(3,3,6)
plt.imshow(x_test[-(iN+1),:,:,0])
cur_axes = plt.gca( )
cur_axes.axes.get_xaxis( ).set_visible(False)
cuSra_vaexde ss.uacxceess.sgfeutil_yyl axis( ) .set_visible(False)
iN=700
plt.subplot(3,3,1)
plt.imshow(x_test_coded[iN,:,:,0])
cur_axes = plt.gca( )
cur_axes.axes.get_xaxis( ).set_visible(False)
cur_axes.axes.get_yaxis( ).set_visible(False)
plt.subplot(3,3,2)
plt.imshow(dip[iN,:,:,0])
cur_axes = plt.gca( )
cur_axes.axes.get_xaxis( ).set_visible(False)
cur_axes.axes.get_yaxis( ).set_visible(False)
plt.subplot(3,3,3)
plt.imshow(x_test[iN,:,:,0])
cur_axes = plt.gca( )
cur_axes.axes.get_xaxis( ).set_visible(False)
cur_axes.axes.get_yaxis( ).set_visible(False)
plt.subplot(3,3,5)
plt.imshow(dip[iN,:,:,1])
cur_axes = plt.gca( )
cur_axes.axes.get_xaxis( ).set_visible(False)
cur_axes.axes.get_yaxis( ).set_visible(False)
plt.subplot(3,3,6)
plt.imshow(x_test[-(iN+1),:,:,0])
cur_axes = plt.gca( )
cur_axes.axes.get_xaxis( ).set_visible(False)
cur_axes.axes.get_yaxis( ).set_visible(False)
iN=2023
plt.subplot(3,3,1)
plt.imshow(x_test_coded[iN,:,:,0])
cur_axes = plt.gca( )
cur_axes.axes.get_xaxis( ).set_visible(False)
cur_axes.axes.get_yaxis( ).set_visible(False)
```

```
plt.subplot(3,3,2)
plt.imshow(dip[iN,:,:,0])
cur_axes = plt.gca( )
cur_axes.axes.get_xaxis( ).set_visible(False)
cur_axes.axes.get_yaxis( ).set_visible(False)
plt.subplot(3,3,3)
plt.imshow(x_test[iN,:,:,0])
cur_axes = plt.gca( )
cur_axes.axes.get_xaxis( ).set_visible(False)
cur_axes.axes.get_yaxis( ).set_visible(False)
plt.subplot(3,3,5)
plt.imshow(dip[iN,:,:,1])
cur_axes = plt.gca( )
cur_axes.axes.get_xaxis( ).set_visible(False)
cur_axes.axes.get_yaxis( ).set_visible(False)
plt.subplot(3,3,6)
plt.imshow(x_test[-(iN+1),:,:,0])
cur_axes = plt.gca( )
cur_axes.axes.get_xaxis( ).set_visible(False)
cur_axes.axes.get_yaxis( ).set_visible(False)
```

At this point, while we have presented this disclosure using some specific examples, those skilled in the art will recognize that our teachings are not so limited. Accordingly, this disclosure should be only limited by the scope of the claims attached hereto.

The invention claimed is:

1. A code division compression method for an array camera system including a plurality of individual micro-cameras that produce a plurality of individual data streams, each individual data stream being produced by a different individual micro-camera and representing its respective individual micro-camera's individual field-of-view, said method CHARACTERIZED BY:

multiplexing the plurality of individual data streams using a code-division-multiple-access (CDMA) technique to produce compressed multiplexed image data, wherein the cdma technique is a remote region code division multiple access technique wherein a coded signal defined by the following is produced:

$q_{ijk}=\text{Sum}_m(x_{ijk}^m c_{ijk}^m)$, wherein $x_{ijk}^m$ is a pixel value and $c_{ijk}^m$ is a code value, each corresponding to an $ij^{th}$ spatial pixel at a time k for an $m^{th}$ micro-camera; and $c_{ijk}^m$ is drawn from +1 and −1; and analyzing the compressed multiplexed image data to identify at least one part of the image data stream for decompression.

2. The method of claim 1 FURTHER CHARACTERIZED BY:

a code sequence for a given micro-camera may be orthogonal or quasi-orthogonal to a code sequence for other micro-cameras.

3. The method of claim 2 FURTHER CHARACTERIZED BY:

performing a multi-pixel transformation on the plurality of individual data streams produced by the individual micro-cameras before multiplexing.

4. The method of claim 2 FURTHER CHARACTERIZED BY:

the CDMA technique is performed without data buffering of the individual data streams.

5. The method of claim 2 FURTHER CHARACTERIZED BY:

the CDMA technique uses direct sequence code division multiple access codes.

6. The method of claim 2 FURTHER CHARACTERIZED BY:

restoring the multiplexed coded data through the use of a neural network.

\* \* \* \* \*